United States Patent [19]
Neri

[11] Patent Number: 4,976,544
[45] Date of Patent: Dec. 11, 1990

[54] METHOD OF INSPECTING THE ENDS OF STACKED CIGARETTES

[75] Inventor: Armando Neri, Bologna, Italy

[73] Assignee: G.D Societa' Per Azioni, Bologna, Italy

[21] Appl. No.: 371,121

[22] Filed: Jun. 26, 1989

[30] Foreign Application Priority Data

Jun. 29, 1988 [IT] Italy ................................ 3525 A/88

[51] Int. Cl.[5] ........................................... G01N 21/88
[52] U.S. Cl. .................................... 356/394; 209/536; 356/237; 358/106
[58] Field of Search ................ 350/237, 294; 209/536; 250/223 R; 358/101, 106, 107, 105

[56] References Cited
U.S. PATENT DOCUMENTS

| 3,473,037 | 10/1969 | Schmermund | 250/223 R |
| 4,344,520 | 8/1982 | Czoch et al. | 358/105 |
| 4,486,098 | 12/1984 | Buchegger et al. | 209/536 |

Primary Examiner—F. L. Evans
Attorney, Agent, or Firm—Marshall, O'Toole, Gerstein, Murray & Bicknell

[57] ABSTRACT

A method of inspecting the ends of cigarettes stacked, in particular, inside a container, with the ends aligned so as to form two opposite lateral surfaces of the mass formed by the same; whereby the ends of the cigarettes are inspected by means of an electro-optical scanning device, usually a telecamera, arranged facing and moving in relation to one of the aforementioned surfaces, so as to scan the same and produce images which are compared with a reference image for enabling rejection of any faulty cigarettes.

10 Claims, 3 Drawing Sheets

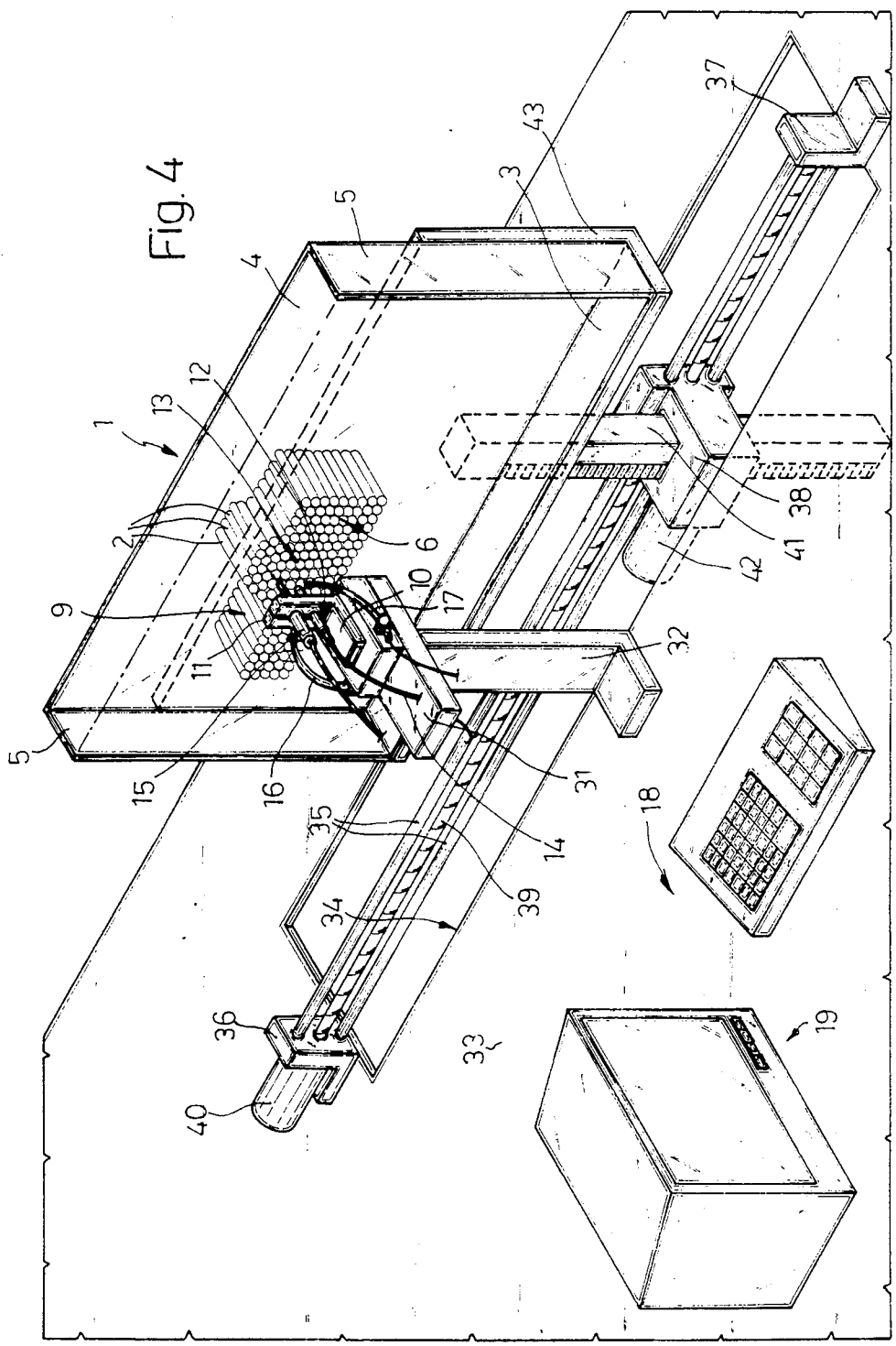

4,976,544

METHOD OF INSPECTING THE ENDS OF STACKED CIGARETTES

BACKGROUND OF THE INVENTION

The present invention relates to a method of inspecting the ends of stacked cigarettes.

Before being fed on to a packing machine, the cigarettes coming off a manufacturing machine are normally inspected to determine conformance with a number of predetermined characteristics.

The introduction of newly designed filters, some featuring one or more axial channels of predetermined section, now makes it necessary to inspect the free end of the filter to determine conformance of the same with a predetermined model.

The cigarettes coming off a filter assembly machine are normally fed in bulk to a packing machine, either along a continuous conveyor belt or inside containers or boxes. In either case, the cigarettes are arranged one on top of the other with their opposite ends substantially aligned in two planes perpendicular to the cigarette axis.

SUMMARY OF THE INVENTION

The aim of the present invention is to provide a straight-forward, efficient method of inspecting the free ends of filters arranged as described above, and so enabling rejection of any faulty cigarettes in the mass so formed. With this aim in view, according to the present invention, there is provided a method of inspecting the ends of cigarettes arranged one on top of the other with their ends aligned so as to form two opposite flat lateral surfaces of the mass formed by the same; characterised by the fact that it comprises stages consisting in:

locating electro-optical scanning means facing a first of said surfaces;

moving said electro-optical scanning means in relation to said mass and over successive portions of said first surface, for scanning and producing images of the same;

comparing each said image with a reference image for locating any faulty cigarettes in said mass.

BRIEF DESCRIPTION OF THE DRAWINGS

A number of non-limiting embodiments of the invention will be described by way of examples with reference to the accompanying drawings, in which:

FIG. 4 shows a view in perspective of a second embodiment of a control device implementing the method according to the present invention.

DETAILED DESCRIPTION OF THE INVENTION

Figure 1:
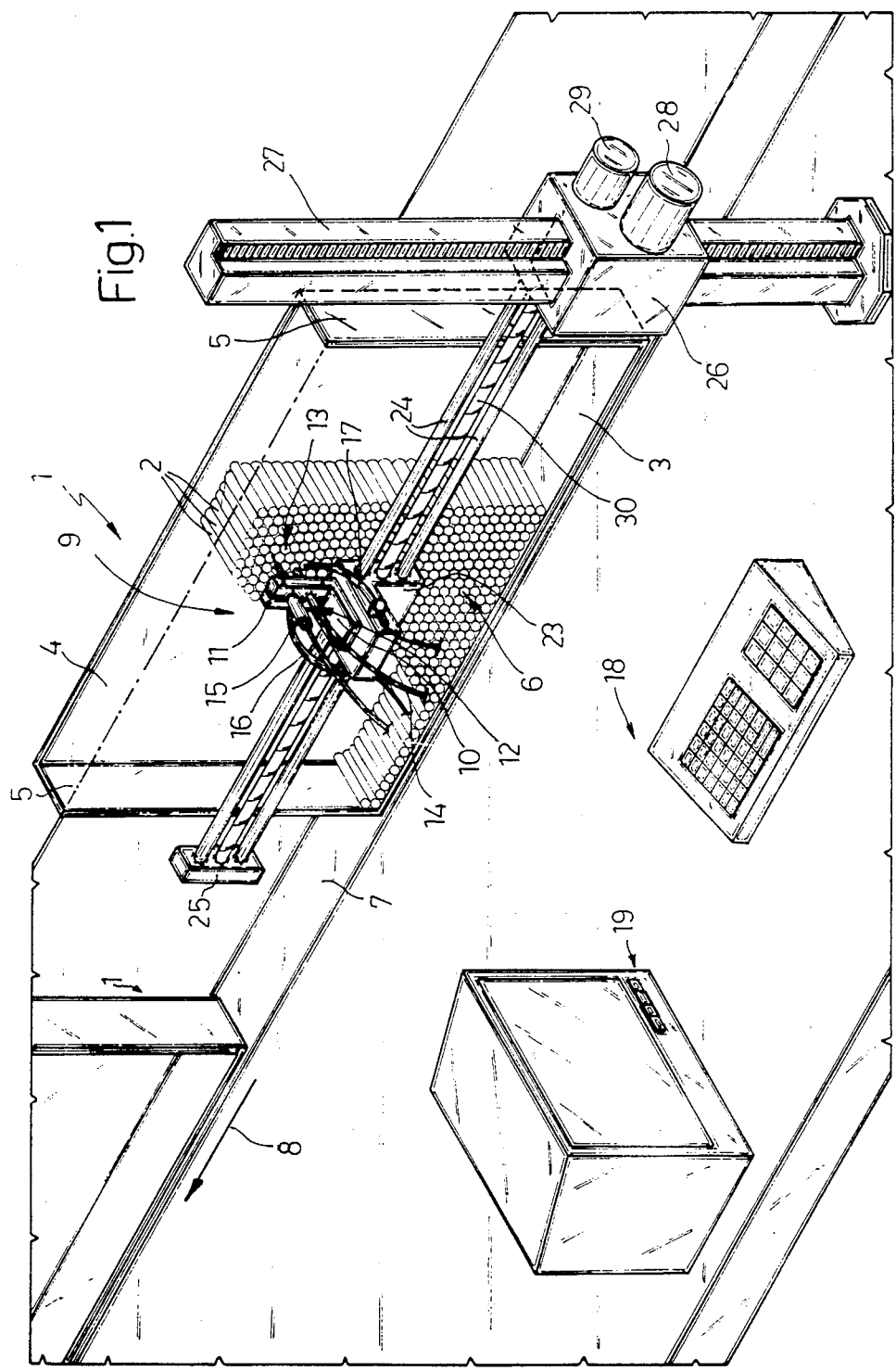
FIG. 1 shows a view in perspective of a first embodiment of a control device implementing the method according to the present invention.

Number 1 in FIG. 1 indicates a container or box for cigarettes 2, substantially in the form of a parallelepipedon and comprising a bottom wall 3, a rear wall 4 perpendicular to wall 3, and two side walls 5 perpendicular to walls 3 and 4.

Inside each container 1, cigarettes 2 are arranged in layers, extending perpendicular to rear wall 4. In particular, cigarettes 2 define, at a first end, a flat surface coincident with the inner surface of wall 4, and, at a second end fitted with the filter, a second flat surface 6 parallel to wall 4 and accessible from outside container 1.

Containers 1 are set on a conveyor belt 7 by which they are fed successively, in the direction of arrow 8, past a control device indicated as a whole by 9. This comprises a platform 10 having a pillar 11 facing surface 6 and supporting the lens 12 of an electro-optical control unit 13, in the example shown a telecamera, comprising a flexible fiberscope 14 connected to lens 12.

Pillar 11 also supports a reject device 15, which may be either a known needle type extractor designed to engage a cigarette 2 by means of a mobile needle (not shown) and withdraw it from the mass of cigarettes 2 inside container 1, or a known marking device designed to mark a cigarette 2, e.g. by spraying it with ink, for subsequent withdrawal.

The opposite lateral surfaces of platform 10 are fitted with two curved optical guides 16 and 17 designed to emit two light beams in different directions and substantially tangent to surface 6, for lighting the area of the same facing lens 12.

Figure 2:
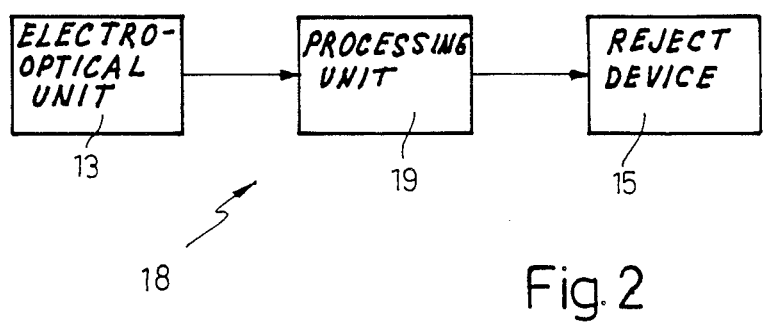
FIG. 2 shows a block diagram of the control unit on the FIG. 1 device.

Control device 9 also comprises a control unit 18 (FIG. 2) which, in addition to electro-optical unit 13, also comprises a processing unit 19 for controlling reject device 15 as a function of signals received from electro-optical unit 13.

Figure 3:
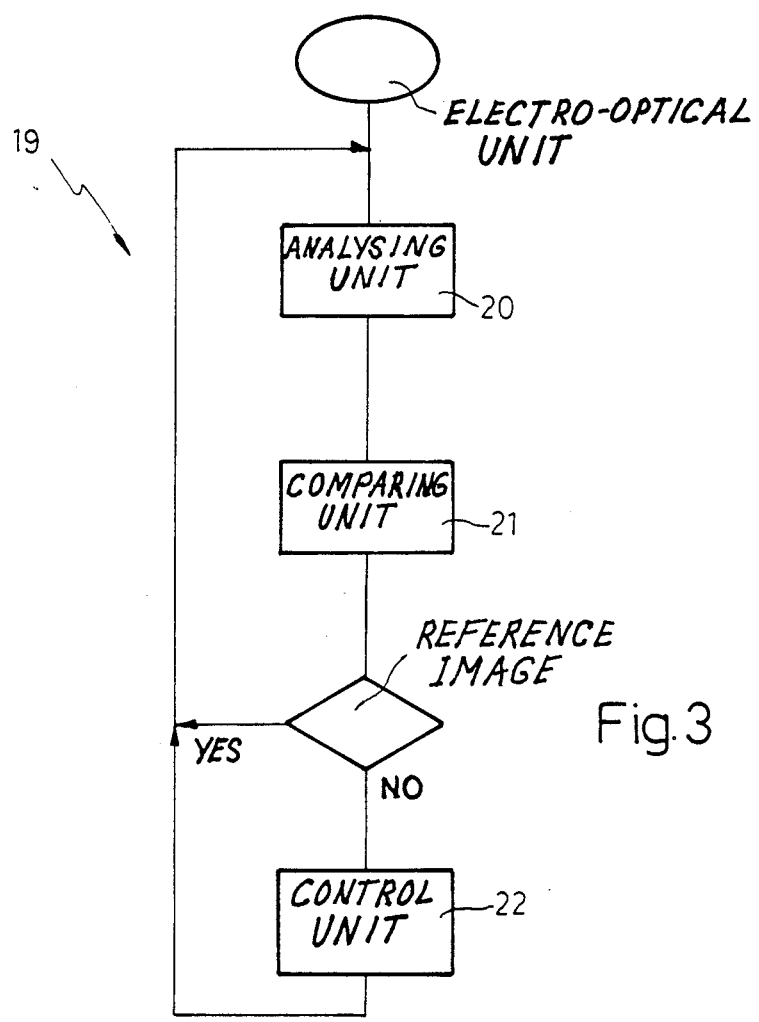
FIG. 3 shows a block diagram of a detail in FIG. 2.

As shown in FIG. 3, processing unit 19 comprises an analysing unit 20 designed to receive an image from unit 13 and to detect and accurately locate on the same the circles corresponding to the ends of cigarettes 2; and a comparing unit 21 designed to compare each detected circle with a reference image, and activate a control unit 22 on reject device 15 whenever one of said circles fails to conform with the reference image.

In the FIG. 1 embodiment, platform 10 is connected integral with a slide 23 mounted on two superimposed horizontal bars 24 extending parallel to surface 6 and connected at one end by a plate 25. At the other end, bars 24 project from a supporting block 26 mounted on a fixed vertical pillar 27 and moved along the same by a reversible motor 28 controlling a rack and pinion coupling between block 26 and pillar 27. Slide 23, on the other hand, is moved along bars 24 by a reversible motor 29 controlling a screw 30 connected to slide 23 via a screw-nut screw coupling.

In actual use, containers 1 are fed forward on conveyor 7 and arrested successively in front of control device 9. At this point, motors 28 and 29 are activated for enabling electro-optical device 13 to perform a complete scan of surface 6, preferably working downwards from left to right in FIG. 1.

Surface 6 is scanned in successive portions, each comprising a number of cigarettes 2 usually arranged in a number of layers, and each defined by the range of lens 12. That is to say, lens 12 frames a given scanning portion, the image of which is sent to unit 19 for processing, and then moves on, parallel to direction 8, to the next portion.

Once each horizontal band of surface 6 has been scanned, lens 12 moves down to scan the next as described above, and so on until the whole of surface 6 has been scanned. It should be pointed out that, within each scanning portion, cigarettes 2 are not arranged according to a predetermined pattern, so that some of them, along the edges of the scanning portion, usually only fall partially within the range of lens 12.

The image of the portion scanned by device 13 is sent to analysing device 20, which is programmed to perform a number of operations, the first of which consists in isolating all the complete circles in the image, and ensuring, by means of a straightforward dimensional check, that each corresponds to the end surface of a cigarette 2. For this purpose, the light beams emitted in different directions by optical guides 16 and 17 provide for highlighting the contours and surface characteristics of said circles.

Analysing device 20 then locates each circle on a cartesian graph, and sends it to comparing unit 21, which compares it with a reference image. In the event of a positive result, the comparing procedure is continued; whereas, in the event of a negative result, the comparing procedure is interrupted until motors 28 and 29 have been activated and the cigarette 2 corresponding to the faulty circle has been marked or withdrawn by reject device 15.

As already stated, each scanning portion may comprise incomplete circles around the edges, which are ignored by comparing unit 21. To ensure the end of each cigarette 2 is checked, each two adjacent scanning portions present an overlapping portion at least equal in width to the diameter of a cigarette 2.

The individual portions of surface 6 are scanned by moving lens 12 at a given rate over surface 6, either by means of step motors 28 and 29 operating at said rate, or continuously, in which case, optical guides 16 and 17 are connected to stroboscopic light sources flashing at said rate.

According to a variation (not shown), motor 29 is dispensed with and lens 12, which is designed to move only vertically, is moved horizontally over surface 6 by activating conveyor 7. This arrangement is always employed for inspecting the ends of cigarettes piled on the conveyor itself, e.g. on the conveyor feeding the cigarettes in bulk from the manufacturing to the packing machine. As, in this case, the travelling speed of the conveyor is not usually constant, scanning is preferably performed using stroboscopic light sources flashing according to the speed of the conveyor.

In the FIG. 4 embodiment, platform 10 supporting electro-optical unit 13 and reject device 15 is in turn supported on a plate 31 secured to the top end of a pillar 32 fixed to a platform 33.

Beneath plate 31, platform 33 presents a substantially rectangular opening 34, along the longer axis of which extend two parallel superimposed bars 35 connected at opposite ends to two supports 36 and 37 adjacent to the bottom lateral edges of opening 34 on platform 33. Bars 35 support a slide 38, which is moved along bars 35 and inside opening 34 by a screw 39, the opposite ends of which are supported in rotary manner on supports 36 and 37. Screw 39 is connected to slide 38 via a screw-nut screw coupling and operated by a reversible motor 40 secured to support 36.

Slide 38 is fitted through with a substantially vertical pillar 41 perpendicular to bars 35, which pillar 41 is connected in sliding manner to slide 38 and designed to move axially in relation to the same by virtue of a reversible motor 42 carried on slide 38 and connected to pillar 41 via a rack and pinion coupling.

A top end portion of pillar 41 is fitted with an L-shaped bracket 43 supporting a container 1 for a mass of cigarettes 2 arranged with surface 6 facing device 13.

The FIG. 4 embodiment operates in exactly the same way as that of FIG. 1, except that, in this case, relative movement of electro-optical device 13 and surface 6 is achieved by maintaining device 13 stationary and moving container 1.

I claim:

1. A method of inspecting the ends of a mass of stacked cigarettes (2) arranged one on top of the other with their ends aligned so as to form two opposite flat lateral surfaces of the mass formed by the same comprising:

locating electro-optical scanning means (13) facing a first (6) of said surfaces;

moving said electro-optical scanning means (13) in relation to said mass and over successive portions of said first surface (6) for scanning and producing images of the same;

comparing each said image with a reference image, for locating any faulty cigarettes (2) in said mass; and removing each faulty cigarette from the mass of stacked cigarettes.

2. A method according to claim 1 including a stage in which each faulty cigarette (2) is marked for rejection.

3. A method according to claim 1 including a stage in which each rejected cigarette (2) is removed from said mass by means of an extractor (15).

4. A method according to claim 1 in which each said scanned portion is illuminated by a light source.

5. A method according to claim 4 in which said light source comprises at least two light beams striking said scanned portion from two different directions.

6. A method according to claim 1 in which said scanned portion comprises a scanned portion overlapping each adjacent first surface portion.

7. A method according to claim 6 in which each said scanned portion includes the ends of a number of cigarettes (2) arranged in layers; each said overlapping portion between two adjacent scanned portions being at least equal in width to the diameter of a cigarette (2).

8. A method according to claim 1 in which said scanned portions are scanned at a given rate; said electro-optical scanning means (13) being moved in step-by-step manner over said surface (6) at said rate.

9. A method according to claim 4 in which said scanned portions are scanned at a given rate; said electro-optical scanning means (13) being moved continuously over said surface (6), and said light source being emitted by stroboscopic lighting means flashing at said rate.

10. A method according to claim 1 in which said electro-optical scanning means comprise a telecamera having a mobile lens (12) connected to said telecamera via a fiberscope (14).

* * * * *